May 19, 1942.  W. G. CARL  2,283,182
ELECTRIC COOKER
Filed Jan. 15, 1941  2 Sheets-Sheet 1
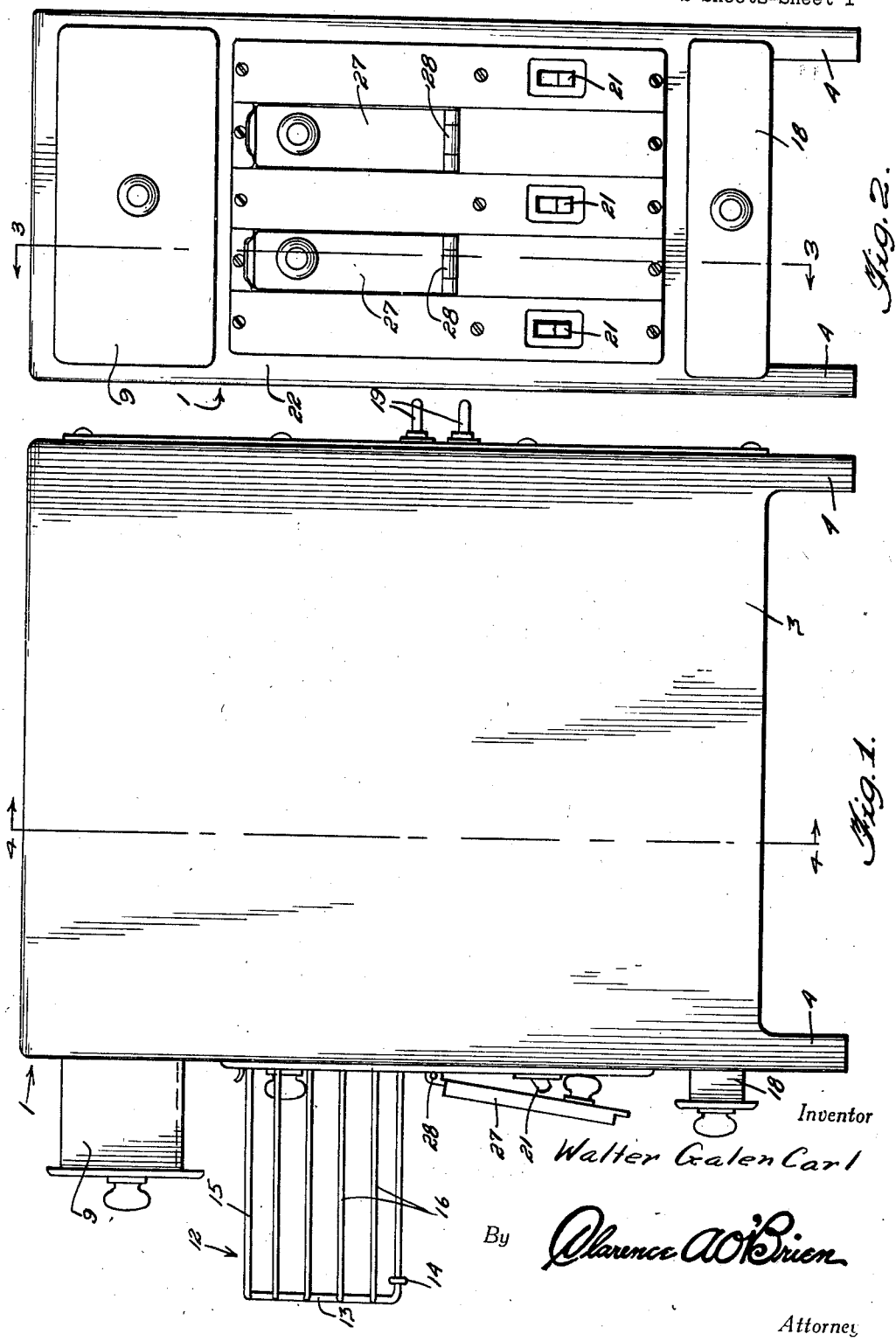

May 19, 1942.   W. G. CARL   2,283,182
ELECTRIC COOKER
Filed Jan. 15, 1941   2 Sheets-Sheet 2
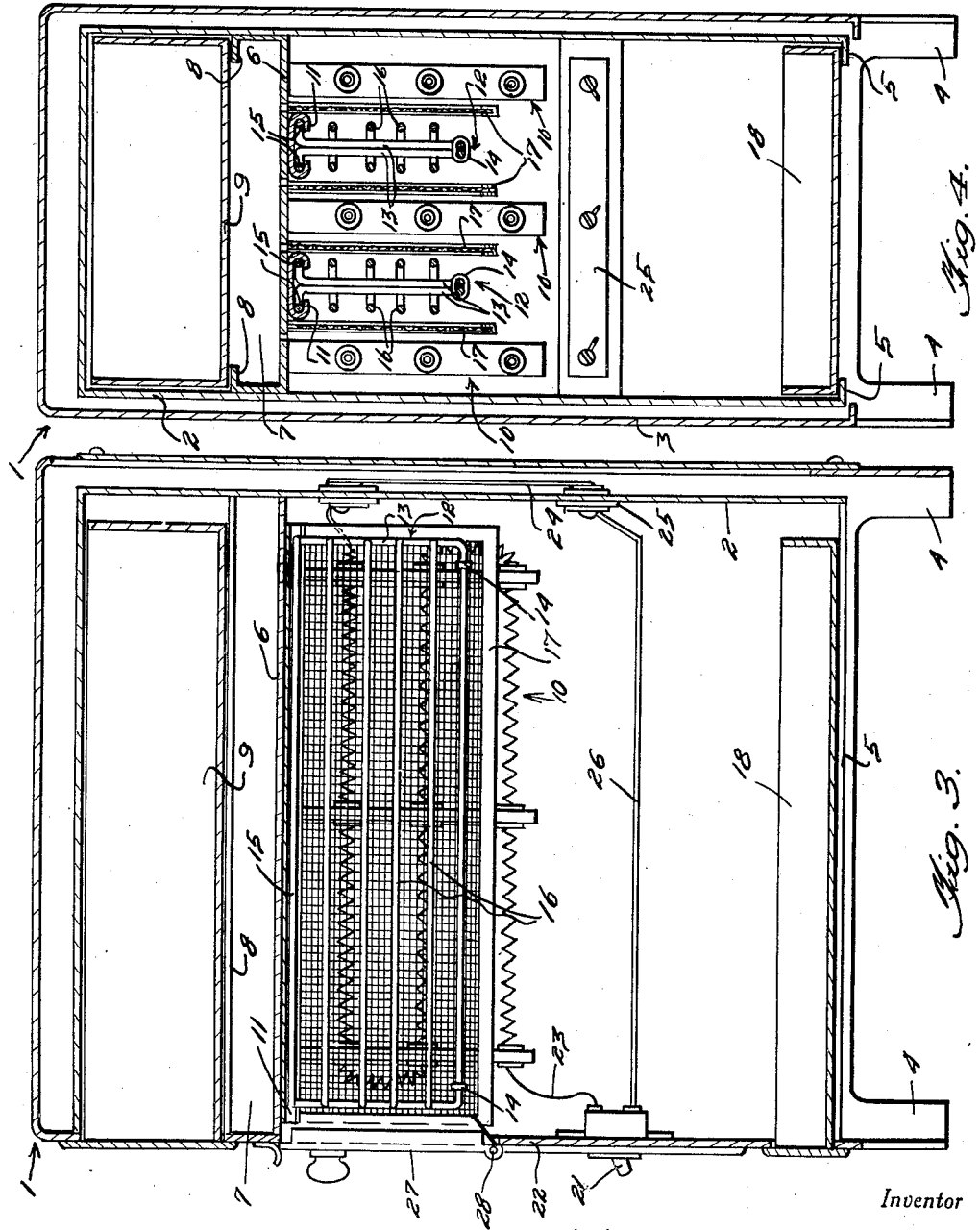
Inventor
Walter Galen Carl
By Clarence A. O'Brien
Attorney Patented May 19, 1942

2,283,182

UNITED STATES PATENT OFFICE 2,283,182

ELECTRIC COOKER

Walter Galen Carl, Mitchell, S. Dak., assignor to Carl Manufacturing Company, Incorporated, Mitchell, S. Dak.

Application January 15, 1941, Serial No. 374,564

2 Claims. (Cl. 219—35)

The present invention relates to new and useful improvements in electric cookers for meats, particularly hamburger and weiners and has for its primary object to provide, in a manner as hereinafter set forth, a device of this character embodying a novel combination and arrangement of heaters, racks or holders, etc., whereby substantially odorless, smokeless and greaseless cooking of the meat may be done.

Another very important object of the invention is to provide an electric cooker of the aforementioned character which embodies unique means for holding the meat to be cooked or broiled in the device.

Still another important object of the invention is to provide a cooker of the character described embodying a novel arrangement of oven for warming buns, for example, while the meat is cooking, the same source of heat being utilized.

A still further important object of the invention is to provide an electric cooker of the character set forth comprising means for taking care of excess grease that may drip from the meat.

Other objects of the invention are to provide an electric cooker which will be comparatively simple in construction, strong, durable, highly efficient and reliable in use, compact, light in weight, sanitary, attractive in appearance and which may be manufactured at low cost.

All of the foregoing and still further objects and advantages of the invention will become apparent from a study of the following specification, taken in connection with the accompanying drawings, wherein like characters of reference designate corresponding parts throughout the several views, and wherein:

Figure 1 is a view in side elevation of an electric cooker constructed in accordance with the present invention, showing the bun pan or drawer, one of the meat racks and the grease tray partially exposed.

Figure 2 is a view in front elevation of the device.

Figure 3 is a view in vertical longitudinal section through the device, taken substantially on the line 3—3 of Figure 2.

Figure 4 is a cross sectional view, taken substantially on the line 4—4 of Figure 1.

Referring now to the drawings in detail, it will be seen that the embodiment of the invention which has been illustrated comprises a cabinet of suitable material which is designated generally by the reference numeral 1. The cabinet 1 includes spaced inner and outer walls 2 and 3, respectively. The cabinet 1 further includes supporting legs 4. The cabinet 1 is open at its bottom and the side portions of the inner walls 2 terminate, at their lower ends, in inturned flanges constituting what may be considered rails 5 the purpose of which will be presently set forth.

In the upper portion of the cabinet 1 is a perforated horizontal partition 6 providing a warming chamber or oven 7. Mounted in the lower portion of the oven 7 on the side walls thereof are rails 8 of angular cross section. Slidably mounted on the rails 8 is a removable pan or drawer 9 for the reception of buns, bread or other articles of food.

Suspended from the horizontal partition 6 are three spaced, parallel vertical electric heating units 10. Mounted beneath the partition 6, between the heating units 10, are longitudinally extending tracks 11 of substantially C-shaped cross section. Slidably mounted on the racks 11 are removable meat racks which are designated generally by the reference numeral 12. Each rack 12 includes a pair of complemental wire grills, said grills comprising frames 13 the lower sides of which are hingedly connected, as at 14. The upper sides or bars of the frames 13 are laterally offset, as at 15, for sliding engagement in the opposed side portions of the tracks 11. The rods 15 are insertable in and removable from the tracks 11 at the forward ends of said tracks. The grills 13 further include longitudinal wire rods 16 having inturned end portions secured to the end members of the frames 13.

Also suspended from the horizontal partition 6, between the heating units 10 and the racks 12, are foraminous shields 17 for preventing grease from splattering on said units 10. Excess grease dripping from the meat in the racks 12 is received by a removable tray 18 which is slidably mounted on the rails 5 in the lower portion of the cabinet 1.

The elements of the electric heating units 10 may receive current from any suitable source of supply. An electric cord may be connected to the cabinet 1 at 19 (see Figure 1). Control switches 21 for the electric units 10 are provided on the front 22 of the cabinet 1. Each switch 21 is electrically connected at 23 with one end of the element of its respective heating unit 10. The other ends of the elements of the units 10 are electrically connected at 24 with a conductor bar 25 which is mounted horizontally in the back portion of the cabinet 1 and insulated therefrom. Then, wires 26 electrically connect the switches 21 to the bar 25.

The pan 9 and the grease tray 18 are insertable and removable through openings provided therefor in the upper and lower portions of the front wall 22 of the cabinet 1. These openings are closed by the front plates or ends of the pan 9 and the tray 18 when said pan and tray are in position. Access to the interior of the cabinet 1 for the insertion and removable of the meat racks 12 is had through the medium of doors 27 which are hingedly mounted at their lower ends, as at 28, for swinging movement in a vertical plane on the front 22 of the cabinet 1. If desired, suitable insulation may be provided between the spaced inner and outer walls of the cabinet 1.

It is thought that the operation of the device will be readily apparent from a consideration of the foregoing. Briefly, the meat or other product to be cooked or broiled is placed in the racks 12. With the doors 27 swung downwardly to open position, the loaded racks 12 are placed in the cabinet between the electric heating units 10, the upper rods 15 of the rack frames 13 sliding in the substantially C-shaped tracks 11 for suspending said racks therefrom. A suitable implement (not shown) may be used for gripping the forward ends of the racks 12 to facilitate insertion and removable thereof. With the loaded racks 12 in position the doors 27 are closed and the switches 21 are closed for energizing the units 10. It will be observed that the construction and arrangement is such that both sides of the meat in the racks 12 will be cooked or broiled simultaneously. Grease dripping from the meat will get caught in the tray 18 which may be expeditiously removed. A suitable depth of water is preferably kept in the tray 18. As hereinbefore stated, grease from the meat is prevented from splattering on the heating units 10 by the foraminous shields 17. Heated and humidified air passes upwardly through the perforations in the horizontal partition 6 for warming buns, bread, rolls, etc., reposing in the pan 9 in the oven 7. Of course, the device may be used for any other purpose for which it may be found adapted and desirable. For example, slices of bread may be placed in the racks 12 and toasted between the heating units 10. It may also be well to here state that heating means other than electric units may be employed.

It is believed that the many advantages of an electric cooker constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

1. An electric cooker comprising, in combination, a cabinet, a perforated horizontal partition in the cabinet providing an oven in the upper portion thereof, a removable pan slidably insertable in the oven, a plurality of spaced, vertical electric heating units suspended from the partition, a plurality of removable food racks slidably mounted beneath the partition between the heating units, foraminous screens suspended from the partition between said racks and the heating units, and a grease tray removably mounted in the cabinet below the racks.

2. A cooker comprising a cabinet, a track of substantially C-shaped cross section mounted in said cabinet, a removable food rack mounted on the track, said rack comprising a pair of opposed, complemental grills, said grills including hingedly connected frames slidably engageable in the track and further including wire rods mounted on said frames, and heating means mounted in the cabinet.

WALTER GALEN CARL.